US011920508B2

(12) United States Patent
Kittaka et al.

(10) Patent No.: US 11,920,508 B2
(45) Date of Patent: Mar. 5, 2024

(54) ANOMALY DETERMINATION DEVICE, ANOMALY DETERMINATION METHOD, AND MEMORY MEDIUM

(71) Applicant: TOYOTA JIDOSHA KABUSHIKI KAISHA, Aichi-ken (JP)

(72) Inventors: Tomoyuki Kittaka, Anjo (JP); Tomoaki Suzuki, Nagoya (JP); Makoto Ohno, Anjo (JP); Takuya Tsujiyama, Toyota (JP); Tadanobu Sobue, Toyokawa (JP); Raishiro Wada, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/184,668

(22) Filed: Mar. 16, 2023

(65) Prior Publication Data

US 2023/0304435 A1 Sep. 28, 2023

(30) Foreign Application Priority Data

Mar. 23, 2022 (JP) ................................ 2022-046890

(51) Int. Cl.
*F01P 11/14* (2006.01)
*F01P 5/10* (2006.01)
*G07C 5/08* (2006.01)

(52) U.S. Cl.
CPC ................ *F01P 11/14* (2013.01); *F01P 5/10* (2013.01); *G07C 5/0808* (2013.01); *G07C 5/0825* (2013.01); *F01P 2031/18* (2013.01)

(58) Field of Classification Search
CPC .......... F01P 11/14; F01P 5/10; F01P 2031/18; G07C 5/0808; G07C 5/0825
See application file for complete search history.

(56) References Cited

U.S. PATENT DOCUMENTS 7,134,322 B1 * 11/2006 Baird ...................... G01M 3/38 73/40.7
2019/0285019 A1 * 9/2019 Dudar ................ F02D 41/0007

FOREIGN PATENT DOCUMENTS

JP 2004-108250 A 4/2004
JP 2021-89202 A 6/2021

* cited by examiner

*Primary Examiner* — Jacob M Amick
(74) *Attorney, Agent, or Firm* — HAUPTMAN HAM, LLP

(57) ABSTRACT

An anomaly determination device, an anomaly determination method, and a memory medium for a water pump are provided. An acquisition process acquires an input variable of a map from image data obtained by capturing an outer surface of the water pump. Execution circuitry obtains provisional determination results from maps, respectively. The provisional determination results are respectively obtained by executing the provisional determination processes for output variables output from the maps. A determination finalizing process treats, as a majority of the provisional determination results, a final determination result indicating whether coolant has leaked out of the water pump.

7 Claims, 5 Drawing Sheets

ANOMALY DETERMINATION DEVICE, ANOMALY DETERMINATION METHOD, AND MEMORY MEDIUM

RELATED APPLICATIONS

The present application claims priority of Japanese Application Number 2022-046890 filed on Mar. 23, 2022, the disclosure of which is hereby incorporated by reference herein in its entirety.

BACKGROUND

1. Field

The present disclosure relates to an anomaly determination device, an anomaly determination method, and a memory medium.

2. Description of Related Art

Japanese Laid-Open Patent Publication No. 2004-108250 discloses an internal combustion engine that includes a water pump. The water pump includes a pump housing, a pump shaft, an impeller, and a seal. The pump housing defines a flow space through which coolant flows. The pump shaft extends through the pump housing. The pump shaft is supported so as to be rotatable relative to the pump housing. A portion of the pump shaft including the first end of the pump shaft is located in the flow space. The impeller is fixed to the first end of the pump shaft. When rotating together with the pump shaft, the impeller forcibly delivers the coolant from the flow space of the pump housing to each section of the internal combustion engine.

The seal is attached to the outer circumferential surface of the pump shaft. In the portion of the pump shaft including the first end, the seal is located closer to the second end of the pump shaft than the impeller. The seal prevents the coolant from leaking from the flow space of the pump housing to the outside of the pump housing.

In the water pump, an excessive amount of coolant may leak from the flow space of the pump housing to the outside of the pump housing due to, for example, deterioration of the seal. In conventional maintenance or the like of the water pump, for example, workers observe the outer surface of the pump housing to determine whether coolant has leaked. However, in such a determination, each worker makes a subjective judgment. Thus, variations occur in the determination indicating whether the coolant has leaked.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides an anomaly determination device. The anomaly determination device makes determination for a water pump that forcibly delivers coolant from an internal combustion engine. The anomaly determination device uses image data obtained by capturing an outer surface of the water pump to determine whether the coolant has leaked out of the water pump. The anomaly determination device includes execution circuitry, which serves as an execution device, and memory circuitry. The memory stores map data that defines a map. The map outputs, when an input variable is input to the map, an output variable that indicates whether the coolant has leaked out of the water pump. The execution circuitry executes an acquisition process that acquires the input variable from the image data and a calculation process that outputs a value of the output variable by inputting, to the map, the input variable acquired through the acquisition process. The execution circuitry executes a provisional determination process that uses the output variable to provisionally determine whether the coolant has leaked out of the water pump and a determination finalizing process that uses a provisional determination result to make a final determination indicating whether the coolant has leaked, the provisional determination result being a determination result of the provisional determination process. The map is one of different maps that are defined by the map data. One or more of the maps have been learned through machine learning in advance. The provisional determination process is one of provisional determination processes. The provisional determination result is one of provisional determination results. The execution circuitry executes the calculation process for the maps and executes the provisional determination processes for the output variables output from the maps. The execution circuitry treats, as a final determination result indicating whether the coolant has leaked, a majority of the provisional determination results in the determination finalizing process.

In the above configuration, the input variables obtained from the image data are used to determine whether coolant has leaked in accordance with the maps defined by the map data. There is no room for a worker to make a subjective judgement in the series of determinations. Thus, the determination result is not varied by the subjective judgment of each worker. In addition, the above configuration treats, as the final determination result, as a majority of the provisional determination results that are based on multiple maps instead of a single map. Accordingly, the determination result is accurate.

In the above configuration, the maps include a specific map including the largest number of types of a variable used as the input variable. The execution circuitry may treat, as the final determination result indicating whether the coolant has leaked, the provisional determination result obtained in a case in which the provisional determination process is executed based on the output variable that is output from the specific map in the determination finalizing process when the number of the provisional determination results indicating that the coolant has leaked is equal to the number of the provisional determination results indicating that the coolant has not leaked.

In the above configuration, as the number of the types of the input variable input to the specific map becomes larger, the provisional determination result based on the output variable output from the specific map becomes more reliable. In the above configuration, when the number of the provisional determination results indicating that the coolant has leaked is equal to the number of the provisional determination results indicating that the coolant has not leaked, the provisional determination results that are more reliable will be used. Accordingly, the numbers of the different provisional determination results are close to each other, the provisional determination result that would be more accurate is set as the final determination result.

In the above configuration, the maps may be maps that have been learned in advance through ensemble learning that is based on the same learning data.

In the above configuration, as compared with when, for example, multiple maps are learned based on learning data that has been acquired under different conditions, variations in the determination result are limited.

Another aspect of the present disclosure provides a non-transitory computer-readable medium that stores an anomaly determination program for causing execution circuitry to execute an anomaly determination process. The anomaly determination process makes determination for a water pump that forcibly delivers coolant from an internal combustion engine. The anomaly determination process uses image data obtained by capturing an outer surface of the water pump to determine whether the coolant has leaked out of the water pump. Memory circuitry includes map data that defines a map. The map outputs, when an input variable is input to the map, an output variable indicating whether the coolant has leaked. The anomaly determination process includes executing, by execution circuitry, an acquisition process that acquires the input variable from the image data, a calculation process that outputs a value of the output variable by inputting the input variable acquired through the acquisition process to the map. The anomaly determination process includes executing, by the execution circuitry, a provisional determination process that uses the output variable to provisionally determine whether the coolant has leaked out of the water pump, and a determination finalizing process that uses a provisional determination result to make a final determination indicating whether the coolant has leaked, the provisional determination result being a determination result of the provisional determination process. The map is one of different maps that are defined by the map data. One or more of the maps have been learned through machine learning in advance. The provisional determination process is one of provisional determination processes. The provisional determination result is one of provisional determination results. The anomaly determination process further includes executing, by the execution circuitry, the calculation process for the maps and executing the provisional determination processes for the output variables output from the maps. The anomaly determination process further includes treating, by the execution circuitry, a majority of the provisional determination results as a final determination result indicating whether the coolant has leaked in the determination finalizing process.

In the above configuration, the input variables obtained from the image data are used to determine whether coolant has leaked in accordance with the maps defined by the map data. There is no room for a worker to make a subjective judgement in the series of determinations. Thus, the determination result is not varied by the subjective judgment of each worker. In addition, the above configuration treats, as the final determination result, as a majority of the provisional determination results that are based on multiple maps instead of a single map. Accordingly, the determination result is accurate.

In the above configuration, the maps include a specific map including the largest number of types of a variable used as the input variable. The anomaly determination process may use the execution circuitry to treat, as the final determination result indicating whether the coolant has leaked, the provisional determination result obtained in a case in which the provisional determination process is executed based on the output variable that is output from the specific map in the determination finalizing process when the number of the provisional determination results indicating that the coolant has leaked is equal to the number of the provisional determination results indicating that the coolant has not leaked.

In the above configuration, as the number of the types of the input variable input to the specific map becomes larger, the provisional determination result based on the output variable output from the specific map becomes more reliable. In the above configuration, when the number of the provisional determination results indicating that the coolant has leaked is equal to the number of the provisional determination results indicating that the coolant has not leaked, the provisional determination results that are more reliable will be used. Accordingly, the numbers of the different provisional determination results are close to each other, the provisional determination result that would be more accurate is set as the final determination result.

Another aspect of the present disclosure may provide an anomaly determination method that executes various processes according to any one of the above anomaly determination devices.

A further aspect of the present disclosure may provide a non-transitory computer-readable memory medium that stores a program that causes a processor to execute various processes according to any one of the above anomaly determination devices.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Schematic Configuration of Internal Combustion Engine

An embodiment will now be described with reference to FIGS. 1 to 7. First, the schematic configuration of an internal combustion engine 100 will be described. Hereinafter, the direction of up and down is a direction viewed from a driver sitting in the driver's seat of a vehicle in a state in which the internal combustion engine 100 is mounted on the vehicle.

Figure 1:
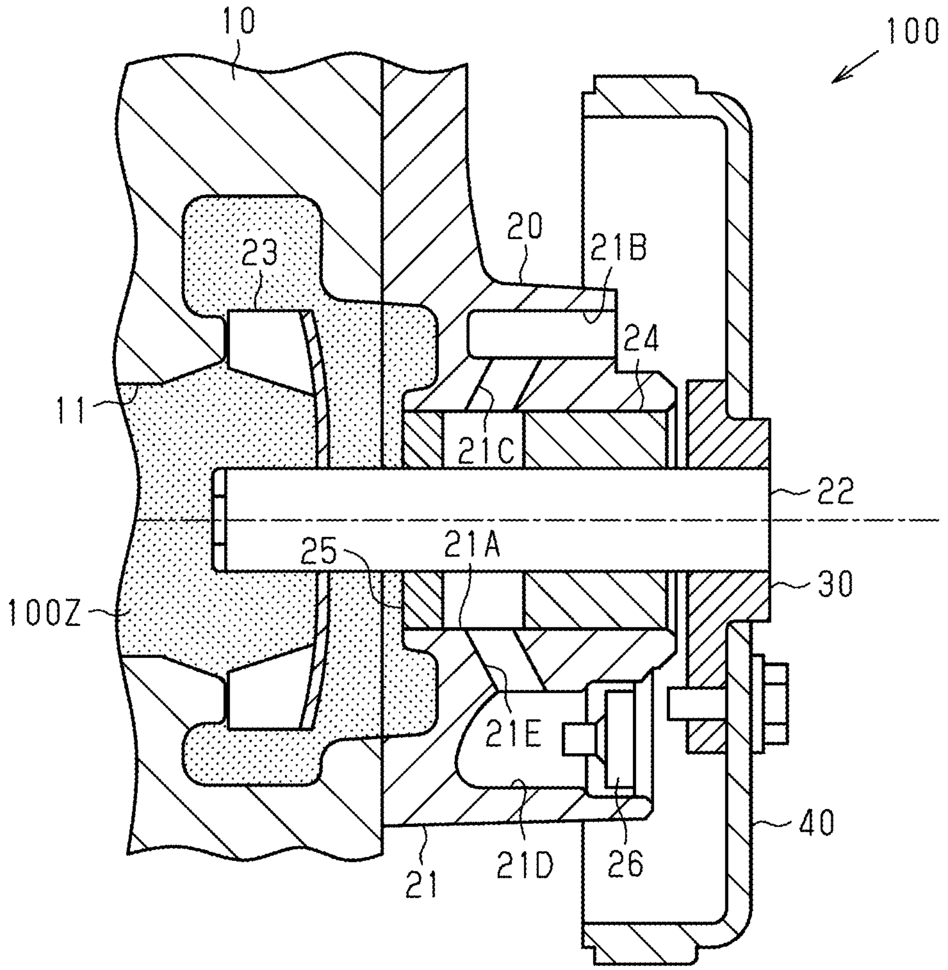
FIG. 1 is a schematic diagram showing the configuration of an internal combustion engine.

As shown in FIG. 1, the internal combustion engine 100 includes a cylinder block 10, a water pump 20, a bracket 30, and a pulley 40. The cylinder block 10 includes cylinders (not shown). The cylinder block 10 includes an internal space 11 that is separate from the cylinders. The internal space 11 is a passage for coolant, which is used to cool the internal combustion engine 100. Part of the internal space 11 opens in a side wall surface of the cylinder block 10.

The water pump 20 includes a pump housing 21, a pump shaft 22, an impeller 23, a bearing 24, a seal 25, and a plug 26. The pump housing 21 is fixed to the side wall surface of the cylinder block 10. The pump housing 21 covers the opening of the internal space 11 of the cylinder block 10. Thus, the pump housing 21 and the cylinder block 10 define a flow space 100Z through which coolant flows. In the present embodiment, the color of coolant is pink.

The pump housing 21 has a through-hole 21A. The bearing 24 is located in the through-hole 21A. The bearing 24 supports the pump shaft 22 so as to be rotatable relative to the pump housing 21. The shape of the pump shaft 22 is substantially a rod. In FIG. 1, the first end of the pump shaft 22 is the left end, and the second end of the pump shaft 22 is the right end. A portion of the pump shaft 22 including the first end of the pump shaft 22 is located in the flow space 100Z. The impeller 23 is fixed to the first end of the pump shaft 22. When rotating together with the pump shaft 22, the impeller 23 forcibly delivers coolant from the flow space 100Z to each section. The seal 25 is attached to the outer circumferential surface of the pump shaft 22. In the portion of the pump shaft 22 including the first end, the seal 25 is located closer to the second end of the pump shaft 22 than the impeller 23. Further, the seal 25 is located at a position of the through-hole 21A closest to the flow space 100Z. The seal 25 prevents the coolant from leaking from the flow space 100Z to the through-hole 21A. That is, the seal 25 prevents the coolant from leaking from the flow space 100Z to the outside of the pump housing 21.

A portion of the pump shaft 22 including the second end of the pump shaft 22 protrudes outward from the pump housing 21. The pulley 40 is fixed to the second end of the pump shaft 22 by the bracket 30. The pulley 40 is coupled to a crankshaft of the internal combustion engine 100 by a belt (not shown). Thus, the pulley 40 is rotated by a driving force from the crankshaft of the internal combustion engine 100. As the pulley 40 rotates, the pump shaft 22 and the impeller 23 rotate.

The pump housing 21 includes an upper space 21B, an upper passage 21C, a lower space 21D, and a lower passage 21E. The upper space 21B is located upward from the through-hole 21A in the pump housing 21. Part of the upper space 21B opens in an outer wall surface of the pump housing 21. The upper space 21B is connected to the through-hole 21A through the upper passage 21C. The lower space 21D is located downward from the through-hole 21A in the pump housing 21. Part of the lower space 21D opens in the outer wall surface of the pump housing 21. The lower space 21D is connected to the through-hole 21A through the lower passage 21E. The plug 26 closes the opening of the lower space 21D. The plug 26 restricts coolant from leaking through the lower space 21D to the outside of the pump housing 21.

In the water pump 20, even if the seal 25 is in a normal state, the coolant that has changed to gas may leak from the flow space 100Z to the through-hole 21A through the seal 25. The gaseous coolant that has reached the through-hole 21A may leak through the upper passage 21C and the upper space 21B to the outside of the pump housing 21. Further, when the gaseous coolant that has reached the through-hole 21A is cooled, the coolant changes to liquid. The liquified coolant may leak through the lower passage 21E and the lower space 21D to the outside of the pump housing 21. The amount of the coolant leaked is slight. Thus, the water pump 20 is designed to permit the coolant to leak.

Schematic Configuration of Anomaly Determination Device

The water pump 20 is subject to a determination made by an anomaly determination device 200. The anomaly determination device 200 will now be described. In the present embodiment, the anomaly determination device 200 is used in a vehicle maintenance place or the like. Examples of the place include an automobile maintenance facility.

Figure 2:
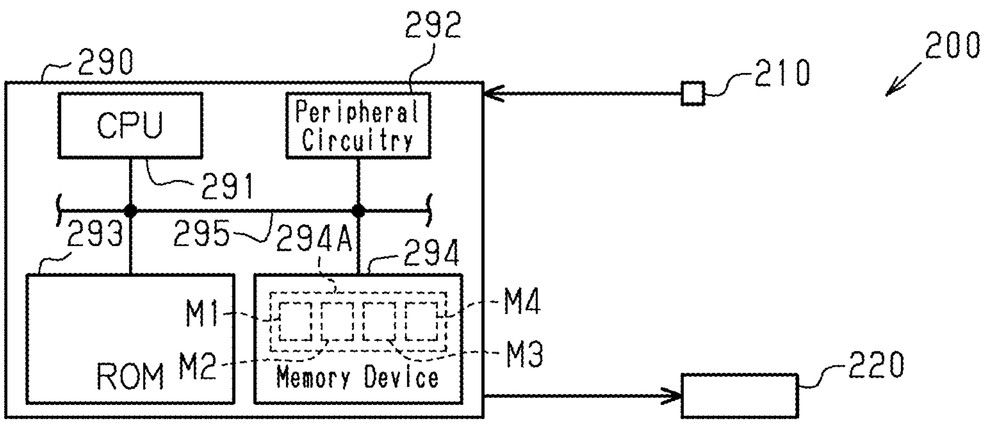
FIG. 2 is a schematic diagram showing the configuration of the anomaly determination device for the internal combustion engine in FIG. 1.

As shown in FIG. 2, the anomaly determination device 200 includes a camera 210, a display 220, and a controller 290. The camera 210 captures an object. The display 220 displays various types of information. In the present embodiment, the display 220 is a touch panel display. That is, the display 220 also receives various types of information.

The controller 290 is electrically connected to the camera 210 and the display 220. Thus, the controller 290 acquires image data captured by the camera 210. Further, the controller 290 causes the display 220 to show various types of information.

The controller 290 includes a CPU 291, peripheral circuitry 292, a ROM 293, a memory device 294, and a bus 295. The bus 295 connects the CPU 291, the peripheral circuitry 292, the ROM 293, and the memory device 294 such that they are communicable with each other. The ROM 293 stores, in advance, various programs with which the CPU 291 functions as a processor that executes various types of control. The memory device 294 stores map data 294A in advance. The map data 294A defines different maps. When an input variable is input to each map defined by the map data 294A, the map outputs an output variable that indicates whether coolant has leaked out of the water pump 20. In the present embodiment, the map data 294A defines a first map M1, a second map M2, a third map M3, and a fourth map M4. The first map M1 is a relational equation. The second map M2 to the fourth map M4 are learned through machine learning in advance. The first map M1 to the fourth map M4 will be described in detail later. The peripheral circuitry 292 includes a circuit that generates a clock signal regulating internal operations, a power supply circuit, and a reset circuit. In the present embodiment, the CPU 291 and the ROM 293 correspond to an execution device or execution circuitry. The memory device 294 corresponds to a memory device or memory circuitry. The anomaly determination device 200 is, for example, a smartphone that serves as a computer. The smartphone functions as the anomaly determination device 200 when the execution circuitry executes an anomaly determination program stored in the ROM 293 and the memory device 294 in advance, an anomaly determination process, or an anomaly determination method.

Procedure of Determination

A procedure for the anomaly determination device 200 to determine whether coolant has leaked out of the water pump 20 will now be described. The procedure for the determination is used for the maintenance or the like of the water pump 20 in, for example, an automobile maintenance facility.

Figure 3:
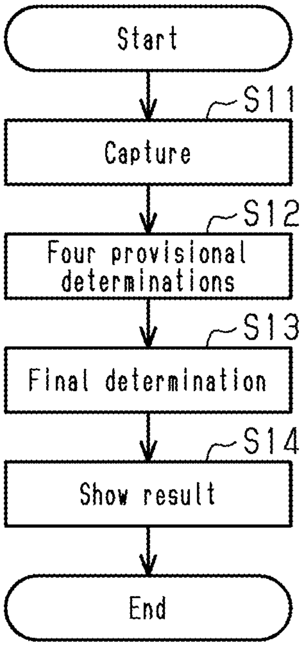
FIG. 3 is a flowchart illustrating a procedure for the anomaly determination device in FIG. 2 to make determination.

Referring to FIG. 3, in step S11, a user (e.g., a worker) uses the camera 210 of the anomaly determination device 200 to capture a section around the opening of the lower space 21D on the outer wall surface (i.e., outer wall) of the water pump 20; that is, capture the vicinity of the plug 26. Further, the worker operates an icon or the like of the display 220 of the anomaly determination device 200 to notify the anomaly determination device 200 that the worker finished capturing the water pump 20. Then, the controller 290 for the anomaly determination device 200 acquires the image data captured by the camera 210. Subsequently, the controller 290 advances the process to step S12.

In step S12, the controller 290 executes an acquisition process that acquires an input variable from the image data captured in step S11. Then, the controller 290 executes a calculation process that outputs the value of an output variable by inputting the input variable acquired in the acquisition process to the map of the map data 294A. Further, the controller 290 uses the output variable to execute a provisional determination process that provisionally determines whether coolant has leaked. The controller 290 executes the calculation process for the maps of the map data 294A and executes the provisional determination process for the output variables output from the maps. As described above, the map data 294A defines the four maps in total; namely, the first map M1 to the fourth map M4. Accordingly, in the present embodiment, the controller 290 uses the first map M1 to the fourth map M4 to respectively execute four provisional determination processes in total. The process of step S12 will be described in detail later. Subsequently, the controller 290 advances the process to step S13.

In step S13, the controller 290 executes a determination finalizing process that uses the provisional determination results, which are determination results of the provisional determination processes, to make a final determination indicating whether the coolant has leaked. In the determination finalizing process, the controller 290 treats, as the final determination result indicating whether the coolant has leaked, a majority of the provisional determination results of the provisional determination processes. For example, when it is determined that coolant has leaked in three of the four provisional determination results of the provisional determination processes, the controller 290 finally determines that the coolant has leaked. In contrast, when it is determined that coolant has not leaked in three of the four provisional determination results of the provisional determination processes, the controller 290 finally determines that the coolant has not leaked. Further, for example, when the number of provisional determination results indicating that coolant has leaked is equal to the number of provisional determination results indicating that coolant has not leaked, the controller 290 treats, as the final determination result indicating whether the coolant has leaked, a provisional determination result that is based on the output variable output from the fourth map M4. Subsequently, the controller 290 advances the process to step S14.

In step S14, the controller 290 outputs, to the display 220, a signal indicating the final determination result obtained through the determination finalizing process. As a result, the display 220 shows the final determination result obtained through the determination finalizing process. The display 220 is an example of predetermined hardware used to notify the worker of the final determination result.

First Provisional Determination Control

A first provisional determination control in the process of step S12 executed by the anomaly determination device 200 will now be described. In the present embodiment, when starting the process of step S12, the controller 290 for the anomaly determination device 200 first executes the first provisional determination control.

Figure 4:
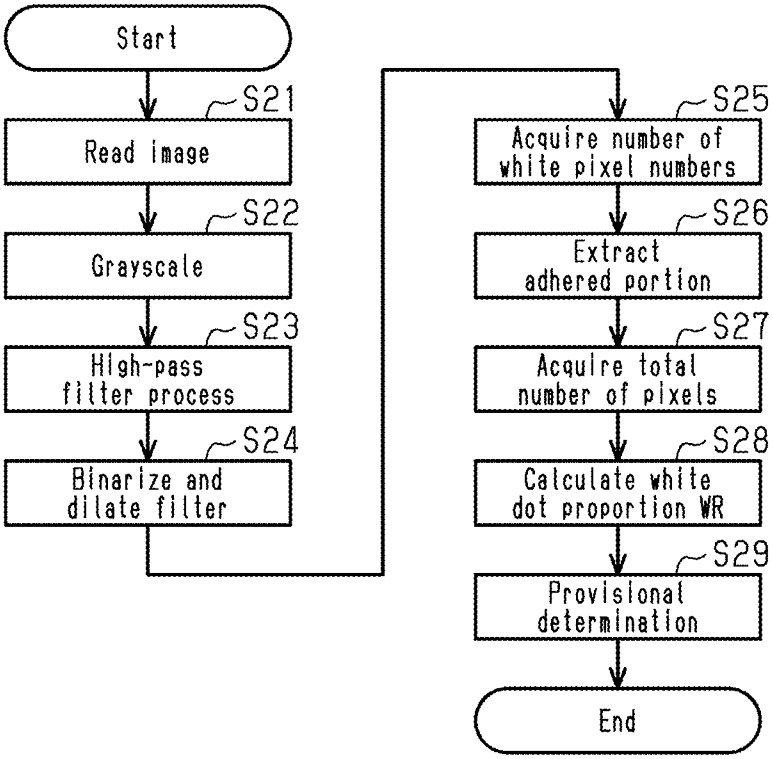
FIG. 4 is a flowchart illustrating the first provisional determination control in FIG. 3.

As shown in FIG. 4, when starting the first provisional determination control, the controller 290 for the anomaly determination device 200 advances the process to step S21. In step S21, the controller 290 reads the image data captured in step S11. Subsequently, the controller 290 advances the process to step S22.

In step S22, the controller 290 converts the image data read in step S21 into a grayscale image. Specifically, the controller 290 converts the image of each pixel in the image data, which was read in step S21, into a gray pixel image that ranges from white to black. Subsequently, the controller 290 advances the process to step S23.

In step S23, the controller 290 executes a high-pass filter process on the image data that has undergone the process of step S22. Specifically, the controller 290 makes the white section noticeable by attenuating the low-frequency components contained in the image data of step S22. Subsequently, the controller 290 advances the process to step S24.

In step S24, the controller 290 executes a binarization process on the image data that has undergone the process of step S23. Specifically, the controller 290 converts the image of each pixel in step S23 into an image of white or black pixels. Further, the controller 290 executes a dilation filter process on the image data. Specifically, the controller 290 converts the black pixels located around white pixels into white to dilate the white section. Subsequently, the controller 290 advances the process to step S25.

In step S25, the controller 290 extracts the white pixels from the image data that has undergone the process of step S24. Then, the controller 290 acquires the number of the white pixels. The portion of the outer wall surface of the water pump 20 to which liquified coolant adheres tends to have a white color when light is reflected. Thus, the process of step S25 is a process that acquires, as the number of pixels, the area of the portion in the image data to which liquified coolant is likely to adhere. Subsequently, the controller 290 advances the process to step S26.

In step S26, the controller 290 extracts, from the image data read in step S21, a portion to which the coolant adheres and a portion in which components contained in the coolant are deposited on the outer wall surface of the water pump 20. As described above, the coolant has a pink color. Thus, the portion in the image data of step S21 to which the coolant adheres has a pink color. Further, as long as the coolant leaks within a permissible range in the design of the water pump 20, the coolant vaporizes immediately. The components contained in the coolant adhere to the outer wall surface of the water pump 20 as pink deposits. Thus, the process of step S26 is a process that extracts pink pixels from the image data of step S21 as a portion to which the coolant and the deposits adhere. Subsequently, the controller 290 advances the process to step S27.

In step S27, the controller 290 acquires the total number of the pink pixels extracted in step S26. Thus, the process of step S27 is a process that acquires, as the number of pixels, the area of the portion in the image data read in step S21 to which the coolant and the deposits adhere. In the present embodiment, the processes of steps S25 and S27 correspond to the acquisition process. Subsequently, the controller 290 advances the process to step S28.

In step S27, the controller 290 sets, as input variables, the number of the white pixels in step S25 and the total number of the pink pixels in step S27 to input the input variables to the first map M1, which is defined by the map data 294A. The first map M1 outputs a white dot proportion WR as an output variable that indicates whether the coolant has leaked out of the water pump 20. Specifically, the first map M1 outputs the white dot proportion WR in accordance with the following equation (1).

white dot proportion $WR$=(the number of the white pixels in step $S25$)/(the number of the pink pixels in step $S27$)×100. Equation (1):

In the present embodiment, the process of step S28 corresponds to the calculation process. Subsequently, the controller 290 advances the process to step S29.

In step S29, the controller 290 determines whether the white dot proportion WR is greater than or equal to a predefined first threshold value Z1. When the white dot proportion WR is relatively large, it indicates that the portion of the outer wall surface of the water pump 20 to which liquified coolant adheres has a larger proportion than the portion to which the coolant and the deposits adhere on the outer wall surface of the water pump 20. The first threshold value Z1 is defined as follows. First, experiments or the like are conducted to drive the internal combustion engine 100, thereby deteriorating the seal 25. During the deterioration, image data is acquired from the section around the opening of the lower space 21D on the outer wall surface of the water pump 20. The acquired image data is used to calculate the white dot proportion W through step S21 to S28. Further, during the deterioration, a skilled worker determines whether the coolant has leaked out of the water pump 20. The first threshold value Z1 is set based on the white dot proportion W and the determination made by the skilled worker. When the white dot proportion W is greater than or equal to the first threshold value Z1, the controller 290 provisionally determines that the coolant has leaked out of the water pump 20. When the white dot proportion W is less than the first threshold value Z1, the controller 290 provisionally determines that the coolant has not leaked out of the water pump 20. Thus, the process of step S29 corresponds to a first provisional determination process. Subsequently, the controller 290 ends the current first provisional determination control.

A second provisional determination control that uses the k-nearest neighbors algorithm in the process of step S12 executed by the anomaly determination device 200 will now be described. In the present embodiment, the anomaly determination device 200 executes the second provisional determination control subsequent to the first provisional determination control.

Figure 5:
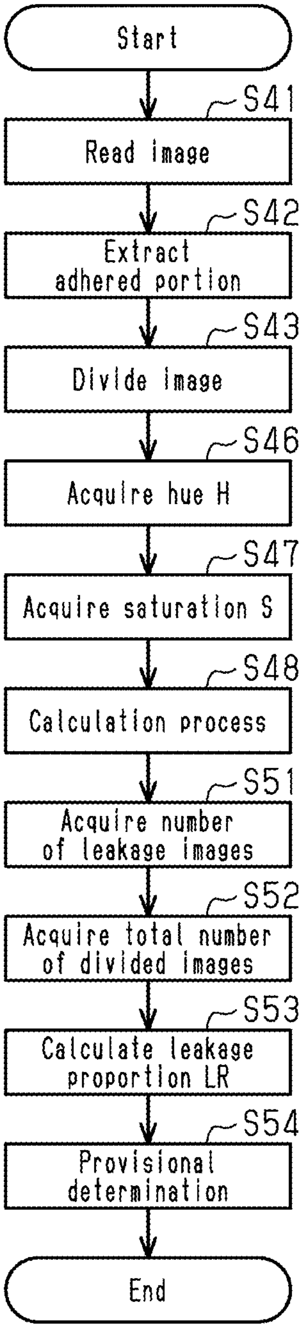
FIG. 5 is a flowchart illustrating the second provisional determination control in FIG. 3.

As shown in FIG. 5, when starting the second provisional determination control, the controller 290 for the anomaly determination device 200 advances the process to step S41. In step S41, the controller 290 reads the image data captured in step S11. Then, the controller 290 advances the process to step S42.

In step S42, the controller 290 extracts, from the image data read in step S41, the portion to which the coolant and the deposits adhere. The process of step S42 is the same as that of step S26. Then, the controller 290 advances the process to step S43.

In step S43, the controller 290 divides, into images, the portion to which the coolant and the deposits adhere extracted in step S42. In this step, the controller 290 executes a division process such that each divided image has the same number of pixels contained in the divided image. Then, the controller 290 advances the process to step S46.

In step S46, the controller 290 acquires a hue H of each divided image obtained in step S43. In other words, the process of step S46 is a process that acquires the hue H at each portion to which the coolant and the deposits adhere. Then, the controller 290 advances the process to step S47.

In step S47, the controller 290 acquires a saturation S of each divided image obtained in step S43. In other words, the process of step S47 is a process that acquires the saturation S at each portion to which the coolant and the deposits adhere. In the present embodiment, the processes of steps S46 and S47 correspond to the acquisition process. Then, the controller 290 advances the process to step S48.

In step S48, the controller 290 sets the hue H in step S46 and the saturation S in step S47 of each divided image in step S43 as input variables and inputs them to the second map M2, which is defined by the map data 294A. The second map M2 outputs an output variable that indicates whether the coolant has leaked out of the water pump 20. Thus, in step S48, the controller 290 acquires, for each divided image obtained in step S43, the output variable indicating whether the coolant has leaked out of the water pump 20. When the coolant has leaked out of the water pump 20, the output variable of the second map M2 is 1. When the coolant has not leaked out of the water pump 20, the output variable of the second map M2 is 0. In the present embodiment, the process of step S48 corresponds to the calculation process.

The second map M2 is defined as follows. First, experiments or the like are conducted to drive the internal combustion engine 100, thereby deteriorating the seal 25. During the deterioration, image data is acquired from the section around the opening of the lower space 21D on the outer wall surface of the water pump 20. The acquired image data is used to acquire the hue H and the saturation S through steps S41 to S47. For example, the k-nearest neighbors algorithm is used so that the second map M2 learns to classify the data into two groups that are based on the hue H and the saturation S. Based on, for example, the state of the deterioration of the seal 25, one of the two groups is set as a group in which the coolant has leaked out of the water pump 20. Further, the other one of the two groups is set as a group in which the coolant has not leaked out of the water pump 20. Subsequent to step S48, the controller 290 advances the process to step S51.

In step S51, the controller 290 acquires the number of images showing that the coolant has leaked out of the water pump 20 from the divided images obtained in step S43. Then, the controller 290 advances the process to step S52.

In step S52, the controller 290 acquires the total number of the divided images obtained in step S43. Thus, the process of step S52 is a process that acquires the total number of the divided images as the portion to which the coolant and the deposits adhere. Then, the controller 290 advances the process to step S53.

In step S53, the controller 290 calculates a leakage proportion LR based on the number of images in which the coolant has leaked in step S51 and the total number of the divided images in step S52. The leakage proportion LR is expressed by the following equation (2).

$$\text{the leakage proportion } LR = (\text{the number of images in which the coolant has leaked in step } S51)/(\text{the total number of the divided images in step } S52)\times 100. \quad \text{Equation (2):}$$

Then, the controller 290 advances the process to step S54.

In step S54, the controller 290 determines whether the leakage proportion LR is greater than or equal to a predefined second threshold value Z2. The second threshold value Z2 is defined as follows. First, experiments or the like are conducted to drive the internal combustion engine 100, thereby deteriorating the seal 25. During the deterioration, image data is acquired from the section around the opening of the lower space 21D on the outer wall surface of the water pump 20. The acquired image data is used to calculate the leakage proportion LR through steps S41 to S53. Further, during the deterioration, a skilled worker determines whether the coolant has leaked out of the water pump 20. The second threshold value Z2 is set based on the leakage proportion LR and the determination made by the skilled worker. When the leakage proportion LR is greater than or equal to the second threshold value Z2, the controller 290 provisionally determines that the coolant has leaked out of the water pump 20. When the leakage proportion LR is less than the second threshold value Z2, the controller 290 provisionally determines that the coolant has not leaked out of the water pump 20. Thus, the process of step S54 corresponds to a second provisional determination process. Subsequently, the controller 290 ends the current second provisional determination control.

A third provisional determination control that uses support vector machines in the process of step S12 executed by the anomaly determination device 200 will now be described. In the present embodiment, the anomaly determination device 200 executes the third provisional determination control subsequent to the second provisional determination control. Part of the third provisional determination control is the same as part of the second provisional determination control. Thus, in the third provisional determination control, the processes that are the same as those of the second provisional determination control are given the same reference numerals, and will not be described or will be described briefly.

Figure 6:
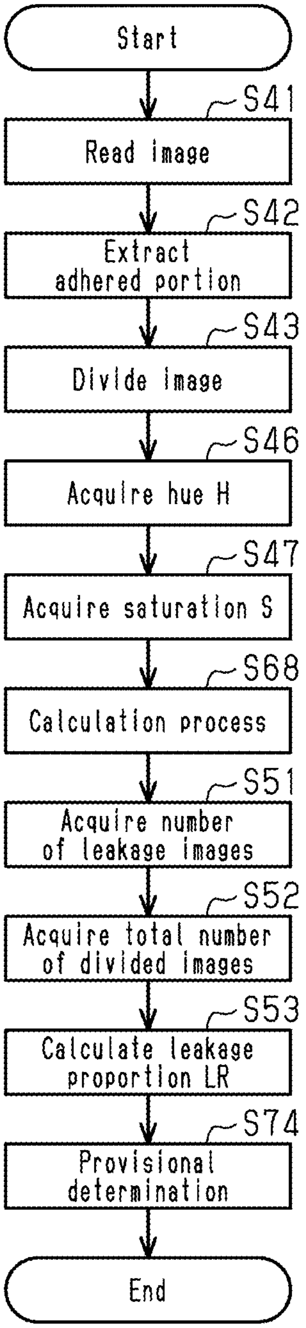
FIG. 6 is a flowchart illustrating the third provisional determination control in FIG. 3.

As shown in FIG. 6, when starting the third provisional determination control, the controller 290 for the anomaly determination device 200 advances the process to step S41. The controller 290 executes the processes of steps S41 to S47. Subsequent to step S47, the controller 290 advances the process to step S68.

In step S68, the controller 290 sets the hue H in step S46 and the saturation S in step S47 of each divided image in step S43 as input variables and inputs them to the third map M3, which is defined by the map data 294A. The third map M3 outputs an output variable that indicates whether the coolant has leaked out of the water pump 20. Thus, in step S68, the controller 290 acquires, for each divided image obtained in step S43, the output variable indicating whether the coolant has leaked out of the water pump 20. When the coolant has leaked out of the water pump 20, the output variable of the third map M3 is 1. When the coolant has not leaked out of the water pump 20, the output variable of the third map M3 is 0. In the present embodiment, the process of step S68 corresponds to the calculation process.

The third map M3 is defined as follows. First, experiments or the like are conducted to drive the internal combustion engine 100, thereby deteriorating the seal 25. During the deterioration, image data is acquired from the section around the opening of the lower space 21D on the outer wall surface of the water pump 20. The image data is used to acquire the hue H and the saturation S through steps S41 to S47. For example, support vector machines are used so that the third map M3 learns to classify the data into two groups that are based on the hue H and the saturation S. Based on, for example, the state of the deterioration of the seal 25, one of the two groups is set as a group in which the coolant has leaked out of the water pump 20. Further, the other one of the two groups is set as a group in which the coolant has not leaked out of the water pump 20.

Subsequent to step S68, the controller 290 advances the process to step S51. The controller 290 executes the processes of steps S51 to S53. Subsequent to step S53, the controller 290 advances the process to step S74.

In step S74, the controller 290 determines whether the leakage proportion LR is greater than or equal to a predefined third threshold value Z3. The third threshold value Z3 is defined as follows. First, experiments or the like are conducted to drive the internal combustion engine 100, thereby deteriorating the seal 25. During the deterioration, image data is acquired from the section around the opening of the lower space 21D on the outer wall surface of the water pump 20. The image data is used to calculate the leakage proportion LR through steps S41 to S53. Further, during the deterioration, a skilled worker determines whether the coolant has leaked out of the water pump 20. The third threshold value Z3 is set based on the leakage proportion LR and the determination made by the skilled worker. When the leakage proportion LR is greater than or equal to the third threshold value Z3, the controller 290 provisionally determines that the coolant has leaked out of the water pump 20. When the leakage proportion LR is less than the third threshold value Z3, the controller 290 provisionally determines that the coolant has not leaked out of the water pump 20. Thus, the process of step S74 corresponds to a third provisional determination process. Subsequently, the controller 290 ends the current third provisional determination control.

A fourth provisional determination control in the process of step S12 executed by the anomaly determination device 200 will now be described. In the present embodiment, the anomaly determination device 200 executes the fourth provisional determination control subsequent to the third provisional determination control.

Figure 7:
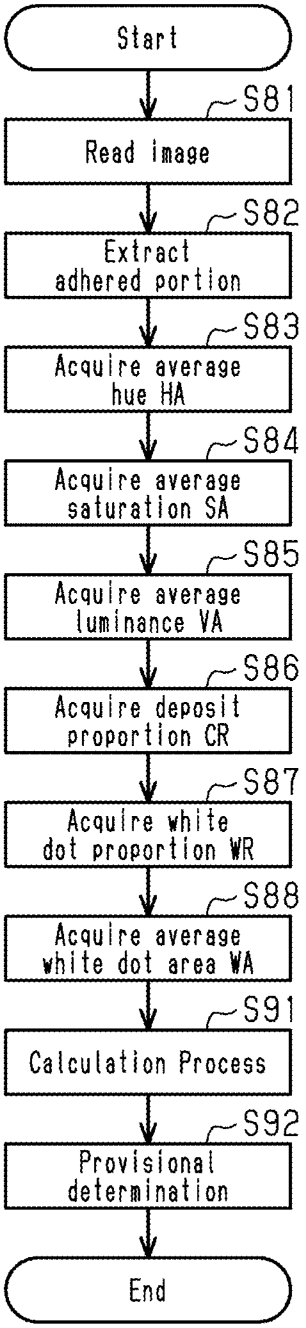
FIG. 7 is a flowchart illustrating the fourth provisional determination control in FIG. 3.

As shown in FIG. 7, when starting the fourth provisional determination control, the controller 290 for the anomaly determination device 200 advances the process to step S81. In step S81, the controller 290 reads the image data that was captured in step S11. Then, the controller 290 advances the process to step S82.

In step S82, the controller 290 extracts, from the image data read in step S81, the portion to which the coolant and the deposits adhere. The process of step S82 is the same as that of step S26. Then, the controller 290 advances the process to step S83.

In step S83, the controller 290 acquires the hue H of each of the pixels of the portion to which the coolant and the deposits adhere, which was extracted in step S82. Then, the controller 290 acquires an average hue HA as the average value of all the hues H acquired. Then, the controller 290 advances the process to step S84.

In step S84, the controller 290 acquires the saturation S of each of the pixels of the portion to which the coolant and the deposits adhere, which was extracted in step S82. Then, the controller 290 acquires an average saturation SA as the average value of all the saturations S acquired. Then, the controller 290 advances the process to step S85.

In step S85, the controller 290 obtains a luminance (brightness) V of each of the pixels of the portion to which the coolant and the deposits adhere, which was extracted in step S82. Then, the controller 290 obtains an average luminance VA as the average value of all of the values of the luminance V obtained. Then, the controller 290 advances the process to step S86.

In step S86, the controller 290 acquires the number of the pixels of the portion to which the coolant and the deposits adhere, which was extracted in step S82. Further, the controller 290 acquires the total number of the pixels in the image data read in step S81. Furthermore, the controller 290 calculates a deposit proportion CR based on the number of the pixels of the portion to which the coolant and the deposits adhere, which was extracted in step S82, and the total number of the pixels in the image data read in step S81. The deposit proportion CR is expressed by the following equation (3).

deposit proportion $CR$=(the number of the pixels of the portion to which the coolant and the deposits adhere,extracted in step $S$82)/(the total number of the pixels in the image data read in step $S$81)×100. Equation (3):

Then, the controller 290 advances the process to step S87.

In step S87, the controller 290 acquires the white dot proportion WR that was calculated in step S28 of the first provisional determination control. Then, the controller 290 advances the process to step S88.

In step S88, the controller 290 extracts the white pixels from the image data that has undergone the process of step S24 of the first provisional determination control. Then, the controller 290 acquires, as a white dot area, the size of the cluster of the white pixels. For example, when the cluster is composed of ten white pixels in total that are vertically and horizontally adjacent to each other, the controller 290 sets the white dot area to 10. For example, when multiple white pixels are not adjacent to each other and are separate from each other, the controller 290 sets the white dot area to 1. The controller 290 specifies the white dot area for all the white pixels. The controller 290 acquires an average white dot area WA as the average value of all the white dot areas. In the present embodiment, the processes of steps S83 and S88 correspond to the acquisition process. Then, the controller 290 advances the process to step S91.

In step S91, the controller 290 sets, as input variables, the average hue HA, the average saturation SA, the average luminance VA, the deposit proportion CR, the white dot proportion WR, and the average white dot area WA and inputs them to the fourth map M4, which is defined by the map data 294A. The fourth map M4 outputs an output variable that indicates whether the coolant has leaked out of the water pump 20. When the coolant has leaked out of the water pump 20, the output variable of the fourth map M4 is 1. When the coolant has not leaked out of the water pump 20, the output variable of the fourth map M4 is 0. In the present embodiment, the process of step S91 corresponds to the calculation process. Of the first map M1 to the fourth map M4, the fourth map M4 includes the largest number of the types of variables used as input variables. Accordingly, in the present embodiment, the fourth map M4 corresponds to a specific map.

The fourth map M4 is defined as follows. First, experiments or the like are conducted to drive the internal combustion engine 100, thereby deteriorating the seal 25. During the deterioration, image data is acquired from the section around the opening of the lower space 21D on the outer wall surface of the water pump 20. The image data is used to acquire the average hue HA, the average saturation SA, the average luminance VA, the deposit proportion CR, the white dot proportion WR, and the average white dot area WA through steps S81 to S88. For example, the k-nearest neighbors algorithm is used so that the fourth map M4 learns to classify the data into two groups that are based on the average hue HA, the average saturation SA, the average luminance VA, the deposit proportion CR, the white dot proportion WR, and the average white dot area WA. Based on, for example, the state of the deterioration of the seal 25, one of the two groups is set as a group in which the coolant has leaked out of the water pump 20. Further, the other one of the two groups is set as a group in which the coolant has not leaked out of the water pump 20. In the present embodiment, the first map M1 to the fourth map M4 have been learned in advance through ensemble learning based on the same learning data acquired under the same condition during the above deterioration of the seal 25. Subsequent to step S91, the controller 290 advances the process to step S92. Ensemble learning is a method for enhancing the accuracy of estimating machine learning by, for example, combining models with each other. Examples of ensemble learning include bagging, boosting, and stacking.

In step S92, the controller 290 provisionally determines whether the coolant has leaked out of the water pump 20 based on the output variables of step S91. Thus, the process of step S54 corresponds to a fourth provisional determination process. Subsequently, the controller 290 ends the current fourth provisional determination control.

Operation of Present Embodiment

In the water pump 20 of the internal combustion engine 100, the seal 25 may, for example, deteriorate. This may cause coolant that remains in a liquid state to leak from the flow space 100Z to the through-hole 21A through the seal 25. Then, the coolant that remains in a liquid state may leak through the lower passage 21E and the lower space 21D to the outside of the pump housing 21. When the liquified coolant leaks, a relatively large amount of coolant leaks. Further, when the liquified coolant leaks, a relatively large amount of coolant adheres to the section around the opening of the lower space 21D on the outer wall surface of the water pump 20. That is, the section around the opening of the lower space 21D is wet.

When determining whether coolant has leaked out of the water pump 20, the worker uses the camera 210 of the anomaly determination device 200 to capture the section around the opening of the lower space 21D on the outer wall surface of the water pump 20 (S11). Further, the controller 290 for the anomaly determination device 200 uses the captured image data to execute four provisional determination processes in total using the first map M1 to the fourth map M4 (S12). Then, the controller 290 executes the determination finalizing process that makes a final determination indicating whether the coolant has leaked, based on the provisional determination results of the four provisional determination processes (S13).

Advantages of Present Embodiment (1) In the present embodiment, there is no room for a worker to make a subjective judgement in the series of determinations. Thus, for example, the determination result is not varied by the subjective judgment of each worker who maintains the water pump 20.

(2) In the determination finalizing process, the controller 290 treats, the final determination result indicating whether coolant has leaked, as a majority of the provisional determination results of the four provisional determination processes in total, which respectively use the first map M1 to the fourth map M4. Thus, as compared with when, for example, the final determination result is obtained based on only one of the first to fourth provisional determination results, the determination result is more accurate.

(3) In the present embodiment, of the first map M1 to the fourth map M4, the fourth map M4 includes the largest number of the types of variables used as input variables. Thus, as the number of the input variables input to the fourth map M4 becomes larger, the provisional determination result of the fourth provisional determination process based on the output variables output from the fourth map M4 becomes more reliable. Taken this into consideration, when the number of provisional determination results indicating that coolant has leaked is equal to the number of provisional determination results indicating that coolant has not leaked, the controller 290 determines, as the final determination result indicating whether the coolant has leaked, the provisional determination result of the fourth provisional determination process using the fourth map M4. Accordingly, even when the numbers of the different provisional determination results are close to each other, the result of the fourth provisional determination process, which would be more accurate, is set as the final determination result.

(4) In the present embodiment, the first map M1 to the fourth map M4 have been learned in advance through ensemble learning based on the same learning data acquired under the same condition during the deterioration of the seal 25. Accordingly, as compared with when, for example, multiple maps are learned based on learning data acquired under different conditions, variations in the determination result are limited.

Modifications

The present embodiment may be modified as follows. The present embodiment and the following modifications can be combined as long as the combined modifications remain technically consistent with each other.

In the embodiment, the input variables to the map defined by the map data 294A may be changed.

Instead, for example, the input variables of the second map M2 may include the luminance V instead of, or in addition to, the hue H and the saturation S. In the same manner, the input variables of the third map M3 may be changed. Further, some of the input variables of the fourth map M4 may be omitted. Alternatively, another input variable may be added to the input variables of the fourth map M4.

For example, the input variables of the second map M2 do not have to be the same as those of the third map M3. Further, for example, the number of the types of variables used as the input variables of the second map M2 may be greater than or less than the number of the types of variables used as the input variables of the third map M3.

For example, the number of the types of variables used as the input variables of the second map M2 may be greater than the number of the types of variables used as the input variables of the fourth map M4. In this case, of the first map M1 to the fourth map M4, when the second map M2 includes the largest number of the types of variables used as input variables, the second map M2 is the specific map. That is, the fourth map M4 does not have to be the specific map, which is prioritized when the numbers of the two types of provisional determination results are close to each other.

In the embodiment, as long as the number of provisional determination processes executed by the controller 290 is greater than or equal to two, that number may be less than or equal to three or may be greater than or equal to five. In this case, the map data 294A defines the number of maps that corresponds to the number of provisional determination processes.

In the embodiment, when the number of provisional determination results indicating that coolant has leaked is equal to the number of provisional determination results indicating that coolant has not leaked, the controller 290 may defer the final determination. In this case, for example, it is preferred that the controller 290 output, to the display 220, a signal that causes the display 220 to show a message or the like that prompts the worker to make an additional determination.

In the embodiment, the first map M1 to the fourth map M4 do not have to be maps that have been learned in advance through ensemble learning based on the same learning data. For example, the first map M1 to the fourth map M4 may be maps that have been learned based on learning data acquired under different conditions. When a larger amount of learning data is used to learn the first map M1 to the fourth map M4, the determination result is less likely to vary.

In the above embodiment, the configurations of the first map M1 to the fourth map M4 may be changed.

For example, the k-nearest neighbors algorithm or support vector machines do not have to be used for the second map M2, the third map M3, and the like. Specifically, neural networks may be used for the second map M2, the third map M3, and the like.

In the embodiment, the execution device does not have to include control circuitry that includes the CPU 291 and the ROM 293 and executes software processing. For example, at least some of the processes executed by the software in the above-described embodiments may be executed by hardware circuits dedicated to executing these processes (such as ASIC). That is, the execution device may be modified as long as it has any one of the following configurations (a) to (c): (a) a configuration including a processor that executes all of the above-described processes according to programs and a program storage device such as a ROM (including a non-transitory computer readable memory medium) that stores the programs; (b) a configuration including a processor and a program storage device that execute part of the above-described processes according to the programs and a dedicated hardware circuit that executes the remaining processes; and (c) a configuration including a dedicated hardware circuit that executes all of the above-described processes. Multiple software execution devices each including a processor and a program storage device and multiple dedicated hardware circuits may be provided.

In the embodiment, the configuration of the anomaly determination device 200 may be changed.

For example, the anomaly determination device 200 may be arranged in a server. Specifically, processes may be executed as follows. First, the image data acquired by a smartphone in step S11 is sent to the server via a communication network by the smartphone. Next, the processes of steps S12 and S13 are executed by the server. Subsequently, a signal indicating the final determination made through the determination finalizing process in step S13 is sent to the smartphone via the communication network by the server. Then, the process of step S14 is executed by the smartphone. In this modification, the anomaly determination device 200 of the server does not include the camera 210 or the display 220. That is, the anomaly determination device 200 only needs to include the execution device and the memory device. The anomaly determination device 200 does not have to include a device that captures image data, a device that outputs a determination result, or the like.

In the embodiment, the configuration of the internal combustion engine 100 may be changed.

For example, the water pump 20 is not limited to a mechanical pump that is driven by a driving force from the crankshaft of the internal combustion engine 100. Instead, for example, the water pump 20 may be an electric pump that is driven by a driving force from an electric motor.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. An anomaly determination device for a water pump, the water pump being subject to a determination made by the anomaly determination device and forcibly delivering coolant from an internal combustion engine, the anomaly determination device comprising:

- execution circuitry; and
- memory circuitry, wherein
- the memory circuitry is configured to store map data that defines a map, the map being configured to output, when an input variable is input to the map, an output variable that indicates whether the coolant has leaked out of the water pump,
- the execution circuitry is configured to execute:
  - an acquisition process that acquires the input variable from image data obtained by capturing an outer surface of the water pump;
  - a calculation process that outputs a value of the output variable by inputting, to the map, the input variable acquired through the acquisition process;
  - a provisional determination process that uses the output variable to provisionally determine whether the coolant has leaked out of the water pump; and
  - a determination finalizing process that uses a provisional determination result to obtain a final determination result indicating whether the coolant has leaked out of the water pump, the provisional determination result being a determination result of the provisional determination process,
- the map is one of different maps that are defined by the map data,
- one or more of the maps have been learned through machine learning in advance,
- the provisional determination process is one of provisional determination processes,
- the provisional determination result is one of provisional determination results, and
- the execution circuitry is further configured to:
  - execute the calculation process for the maps and obtain the provisional determination results, the provisional determination results being respectively obtained by executing the provisional determination processes for the output variables output from the maps, and
  - treat, as the final determination result indicating whether the coolant has leaked, a majority of the provisional determination results in the determination finalizing process.

2. The anomaly determination device according to claim 1, wherein

- the maps include a specific map including the largest number of types of a variable used as the input variable, and
- the execution circuitry is configured to treat, as the final determination result indicating whether the coolant has leaked, the provisional determination result obtained in a case in which the provisional determination process is executed based on the output variable that is output from the specific map in the determination finalizing process when the number of the provisional determination results indicating that the coolant has leaked is equal to the number of the provisional determination results indicating that the coolant has not leaked.

3. The anomaly determination device according to claim 1, wherein the maps have been learned in advance through ensemble learning that is based on the same learning data.

4. An anomaly determination method for a water pump, memory circuitry storing map data that defines a map, the anomaly determination method comprising:

- acquiring, by execution circuitry, an input variable to the map from image data obtained by capturing an outer surface of the water pump, the water pump forcibly delivering coolant from an internal combustion engine;
- executing, by the execution circuitry, a calculation process that outputs a value of an output variable of the map by inputting the input variable to the map, the output variable indicating whether the coolant has leaked out of the water pump;
- executing, by the execution circuitry, a provisional determination process that uses the output variable to obtain a provisional determination result indicating whether the coolant has leaked out of the water pump; and
- executing, by the execution circuitry, a determination finalizing process that uses the provisional determination result to obtain a final determination result indicating whether the coolant has leaked out of the water pump,
- the map is one of different maps that are defined by the map data,
- one or more of the maps have been learned through machine learning in advance,
- the provisional determination process is one of provisional determination processes,
- the provisional determination result is one of provisional determination results, and
- the anomaly determination method further comprises:
  - executing, by the execution circuitry, the calculation process for the maps;
  - obtaining, by the execution circuitry, the provisional determination results, the provisional determination results being respectively obtained by executing the provisional determination processes for the output variables output from the maps, and
  - treating, by the execution circuitry, a majority of the provisional determination results as the final determination result in the determination finalizing process.

5. The anomaly determination method according to claim 4, wherein the maps include a specific map including the largest number of types of a variable used as the input variable, and the anomaly determination methods further comprises treating, by the execution circuitry, as the final determination result indicating whether the coolant has leaked, the provisional determination result obtained in a case in which the provisional determination process is executed based on the output variable that is output from the specific map in the determination finalizing process when the number of the provisional determination results indicating that the coolant has leaked is equal to the number of the provisional determination results indicating that the coolant has not leaked.

6. A non-transitory computer-readable medium that stores a program for causing execution circuitry to execute an anomaly determination process for a water pump, memory circuitry storing map data that defines a map, the anomaly determination process comprising:

acquiring, by execution circuitry, an input variable to the map from image data obtained by capturing an outer surface of the water pump, the water pump forcibly delivering coolant from an internal combustion engine;

executing, by the execution circuitry, a calculation process that outputs a value of an output variable of the map by inputting the input variable to the map, the output variable indicating whether the coolant has leaked out of the water pump;

executing, by the execution circuitry, a provisional determination process that uses the output variable to obtain a provisional determination result indicating whether the coolant has leaked out of the water pump; and executing, by the execution circuitry, a determination finalizing process that uses the provisional determination result to obtain a final determination result indicating whether the coolant has leaked out of the water pump, the map is one of different maps that are defined by the map data, one or more of the maps have been learned through machine learning in advance, the provisional determination process is one of provisional determination processes, the provisional determination result is one of provisional determination results, and the anomaly determination process further comprises:

executing, by the execution circuitry, the calculation process for the maps;

obtaining, by the execution circuitry, the provisional determination results, the provisional determination results being respectively obtained by executing the provisional determination processes for the output variables output from the maps, and treating, by the execution circuitry, a majority of the provisional determination results as the final determination result in the determination finalizing process.

7. The non-transitory computer-readable medium according to claim 6, wherein the maps include a specific map including the largest number of types of a variable used as the input variable, and the anomaly determination methods further comprises treating, by the execution circuitry, as the final determination result indicating whether the coolant has leaked, the provisional determination result obtained in a case in which the provisional determination process is executed based on the output variable that is output from the specific map in the determination finalizing process when the number of the provisional determination results indicating that the coolant has leaked is equal to the number of the provisional determination results indicating that the coolant has not leaked.

* * * * *